US012619734B2

(12) United States Patent　　　(10) Patent No.:　US 12,619,734 B2
　　Srivastava et al.　　　　　　　　(45) Date of Patent:　　May 5, 2026

(54) AUTOMATIC CLASSIFICATION OF SECURITY VULNERABILITIES

(71) Applicant: SAP SE, Walldorf (DE)

(72) Inventors: Abhinav Srivastava, Gorakhpur (IN);
　　　　　　　Krishna Prasad P, Kasaragod (IN);
　　　　　　　Anurag Negi, Pauri Garhwal (IN);
　　　　　　　Pratim Milind Ugale, Mumbai (IN)

(73) Assignee: SAP SE, Walldorf (DE)

( * ) Notice: Subject to any disclaimer, the term of this patent is extended or adjusted under 35 U.S.C. 154(b) by 217 days.

(21) Appl. No.: 18/190,391

(22) Filed: Mar. 27, 2023

(65) Prior Publication Data

US 2024/0330473 A1　　Oct. 3, 2024

(51) Int. Cl.
　　*G06F 21/57*　　　(2013.01)
　　*G06F 21/55*　　　(2013.01)
(52) U.S. Cl.
　　CPC .......... *G06F 21/577* (2013.01); *G06F 21/554* (2013.01)
(58) Field of Classification Search
　　CPC .............................. G06F 21/577; G06F 21/554
　　See application file for complete search history.

(56) References Cited

U.S. PATENT DOCUMENTS 12,118,095 B1 * 10/2024 Millar ..................... G06N 20/00
12,135,789 B2 * 11/2024 Labreche ............... G06N 20/00

2018/0314835 A1 * 11/2018 Dodson ................. G06N 20/00
2020/0327008 A1 * 10/2020 Singh ...................... G06F 9/451
2022/0100868 A1 *  3/2022 Tarrant .................. G06N 20/00
2023/0315991 A1 * 10/2023 Zhang .................. G06F 21/552
2023/0388330 A1 * 11/2023 Zelivansky ......... H04L 63/1433
2024/0119160 A1 *  4/2024 Raj .......................... G06F 8/65
2024/0177054 A1 *  5/2024 Li .......................... G06N 20/00
2024/0250979 A1 *  7/2024 Ding ................. H04L 63/1433
2024/0289354 A1 *  8/2024 Bhattacharya ........ G06F 16/285
2024/0323219 A1 *  9/2024 Hagh ................. H04L 63/1433

* cited by examiner

*Primary Examiner* — Linglan Edwards
*Assistant Examiner* — Jacob Benedict Knackstedt
(74) *Attorney, Agent, or Firm* — SCHWEGMAN LUNDBERG & WOESSNER, P.A.

(57)　　　　　　ABSTRACT

Example methods and systems are directed to the automated assessment of vulnerabilities in the context of information technology (IT) security. A data record of a vulnerability is accessed. The vulnerability includes a vulnerability description and may also identify an application in respect of which the vulnerability was detected by an IT security tool. An input vector is automatically generated based on the vulnerability description. A machine learning model uses the input vector to generate a probability score. A positivity classification for the vulnerability is automatically determined based on the probability score. Output data representing the positivity classification is caused to be presented in a user interface. The positivity classification may indicate whether the vulnerability is deemed to be a false positive or a true positive. Example methods and systems provide a unified dashboard for presenting multiple vulnerabilities and positivity classifications relating to one or more applications.

20 Claims, 10 Drawing Sheets

122

Figure 4:
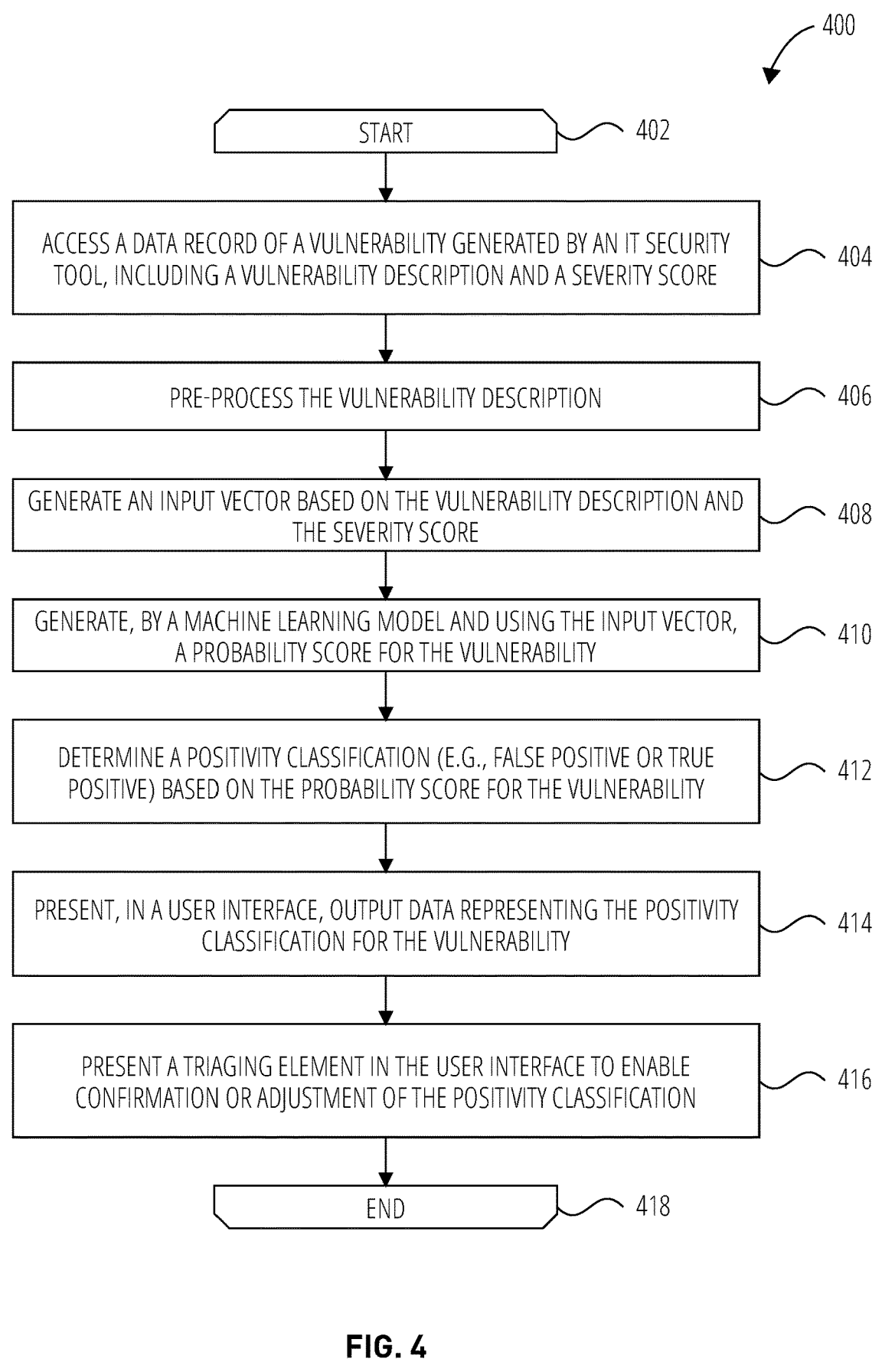

400

START — 402

↓

ACCESS A DATA RECORD OF A VULNERABILITY GENERATED BY AN IT SECURITY TOOL, INCLUDING A VULNERABILITY DESCRIPTION AND A SEVERITY SCORE — 404

↓

PRE-PROCESS THE VULNERABILITY DESCRIPTION — 406

↓

GENERATE AN INPUT VECTOR BASED ON THE VULNERABILITY DESCRIPTION AND THE SEVERITY SCORE — 408

↓

GENERATE, BY A MACHINE LEARNING MODEL AND USING THE INPUT VECTOR, A PROBABILITY SCORE FOR THE VULNERABILITY — 410

↓

DETERMINE A POSITIVITY CLASSIFICATION (E.G., FALSE POSITIVE OR TRUE POSITIVE) BASED ON THE PROBABILITY SCORE FOR THE VULNERABILITY — 412

↓

PRESENT, IN A USER INTERFACE, OUTPUT DATA REPRESENTING THE POSITIVITY CLASSIFICATION FOR THE VULNERABILITY — 414

↓

PRESENT A TRIAGING ELEMENT IN THE USER INTERFACE TO ENABLE CONFIRMATION OR ADJUSTMENT OF THE POSITIVITY CLASSIFICATION — 416

↓

END — 418

START — 502

GENERATE POSITIVITY CLASSIFICATION FOR VULNERABILITY — 504

DETERMINE THE VULNERABILITY TO BE A FALSE POSITIVE — 506

Y                CONFIDENCE
                    ABOVE            N
                 THRESHOLD?

508

510

INVOKE AUTOMATIC TRIAGING FUNCTION

514

INVOKE USER CONFIRMATION FUNCTION

PRESENT AUTOMATIC TRIAGING
INDICATOR IN DASHBOARD

512

PRESENT TRIAGING ELEMENT IN
DASHBOARD

516

END — 518

AUTOMATIC CLASSIFICATION OF SECURITY VULNERABILITIES

TECHNICAL FIELD

The subject matter disclosed herein generally relates to information technology (IT) security. Specifically, but not exclusively, the present disclosure addresses systems and methods to assess, classify, and present vulnerabilities reported by IT security tools.

BACKGROUND

Finding security flaws or other vulnerabilities in computing devices, systems, or applications may require a variety of IT security tools. Analyzing and triaging these vulnerabilities, including initiating remediation tasks and finding false positives, are important tasks to ensure compliance with security standards and protocols. In some cases, each security tool has a separate user interface or Application Programming Interface (API) for reporting vulnerabilities. Reviewing vulnerabilities across different tools, triaging them to ensure that risks are prioritized and appropriate action is taken where it may be needed, and keeping track of the status of such vulnerabilities, may thus be difficult, time-consuming, or expensive.

BRIEF DESCRIPTION OF THE DRAWINGS

Some embodiments are illustrated by way of example and not limitation in the figures of the accompanying drawings.

FIG. 4 is a flowchart illustrating operations of a method suitable for automatic classification of vulnerabilities, according to some examples.

DETAILED DESCRIPTION

Figure 1:
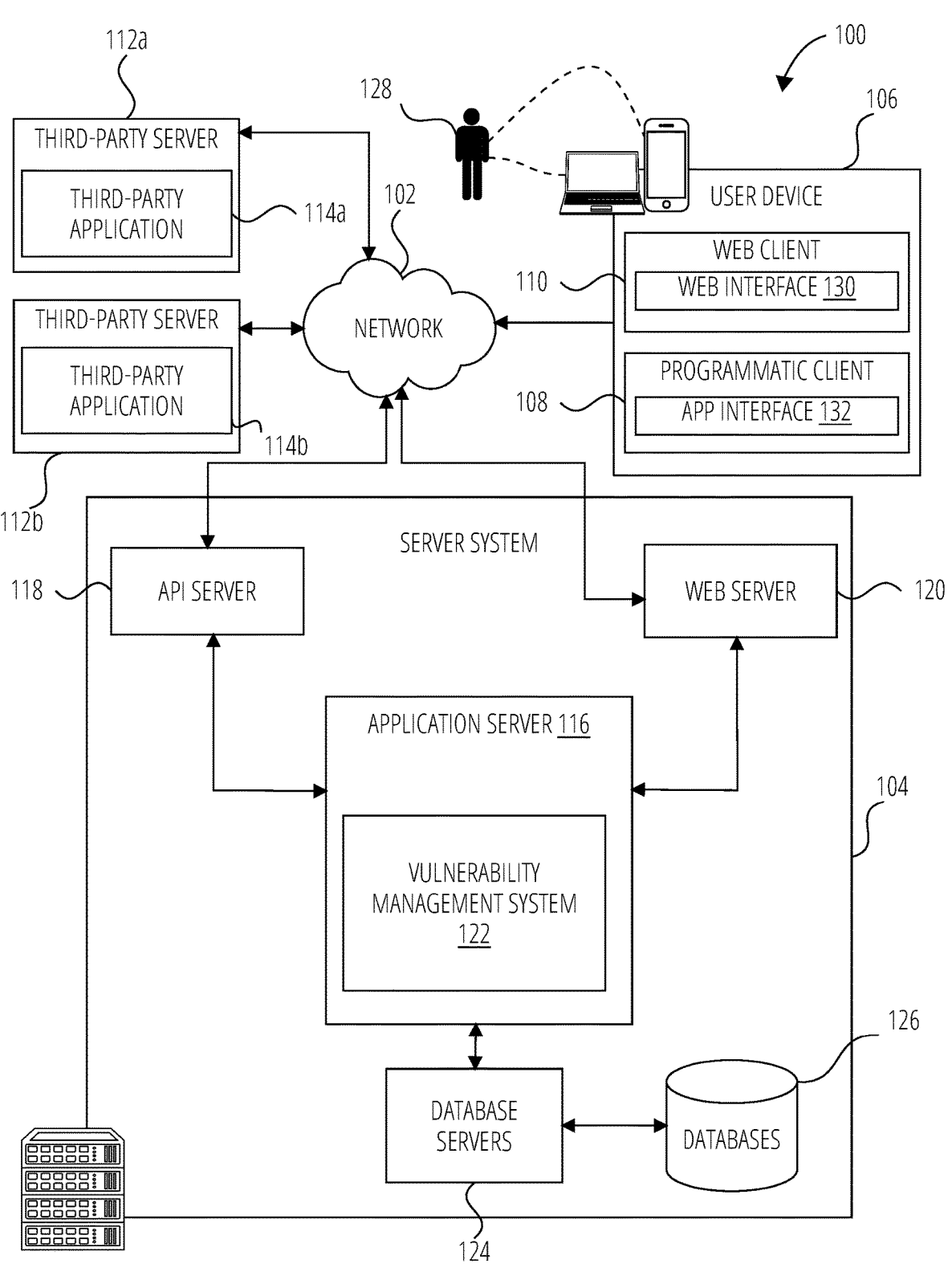
FIG. 1 is a diagrammatic representation of a network environment suitable for automatic classification of vulnerabilities, according to some examples.

Example methods and systems are directed to the automatic classification of vulnerabilities that are detected by IT security tools. As used herein, the term "vulnerability" refers to any flaw or weakness in a computing device, system, application, or network, that may weaken security in the device, system, application, or network, or make it vulnerable to attack or exploitation. A vulnerability may be a flaw or weakness in software, hardware, security procedures, design, implementation, controls, or combinations thereof, that could lead to an undesirable event compromising the security of the device, system, application, or network.

As used herein, the term "IT security tool," or simply "security tool," refers to any one or more computer programs designed to assess a computing device, system, application, or network, to identify or detect a vulnerability. A security tool may be installed on a user device or accessed remotely, e.g., made available as a service. A vulnerability scanner is an example of a security tool. For instance, when developing a container-based application, multiple vulnerability scanners may be used to check for vulnerabilities that could be exploited by attackers, e.g., container scanners and static code analysis tools.

A user may have a need for an automated system suitable for analyzing vulnerabilities and classifying them automatically to facilitate triaging. As used herein, the term "triaging" refers to a process of prioritizing, categorizing, classifying, or assigning remediation action items to vulnerabilities, e.g., based on their severity and potential impact. Triaging objectives may include ensuring that the most important or significant vulnerabilities are addressed as soon as possible, and allocating resources efficiently to mitigate security risks.

Machine learning models are applications that provide computer systems the ability to perform tasks, without explicitly being programmed, by making inferences based on patterns found in the analysis of data. Machine learning explores the study and construction of algorithms, also referred to herein as models, that may learn from existing data and make predictions about new data. In some examples, a machine learning model is employed to provide automated classification functionality.

A data record of a vulnerability generated by an IT security tool is accessed. The data record may comprise a vulnerability description and a severity score for the vulnerability. In some examples, the vulnerability description comprises one or more text objects, while the severity score is a numerical score. As used herein, the term "text object" refers to any character or sequence of characters. A text object may thus include letters, numbers, punctuation, and other symbols. A text object can represent a single character, a word, or a longer string of text.

An input vector is generated based on the vulnerability description. In some examples, a machine learning model uses the input vector to generate a probability score for the vulnerability, and a positivity classification is automatically generated. The positivity classification may indicate that the vulnerability detected by the IT security tool is a false positive (not a genuine vulnerability) or a true positive (genuine vulnerability). In some examples, output data representing the positivity classification for a vulnerability is presented on a user device via a user interface.

Natural language processing may be used to generate a numerical representation of the text objects in a vulnerability description. The numerical representation of the text objects may be combined with a corresponding severity score to generate or obtain an input vector for processing by the machine learning model.

Example systems and methods described herein allow for multiple vulnerabilities to be classified and presented in a dashboard, including user-selectable triaging elements. For example, multiple security tools used to detect vulnerabilities in a software application may be linked to a user account, allowing for positivity classifications and other output data relating to vulnerability reports from different security tools to be presented in and managed from a single, unified dashboard. In some examples, a vulnerability management system invokes an automatic triaging function to triage a reported vulnerability without requiring user input. This may be referred to as a "self-healing" function.

Examples disclosed herein provide for a flexible and customizable vulnerability management system that is able to integrate multiple disparate security tools or integrate with project management systems. Systems according to examples described herein may perform better (e.g., be more accurate, return results faster, or require less human intervention) than systems relying on manual classification or triaging.

When the effects in this disclosure are considered in aggregate, one or more of the methodologies described herein may obviate a need for certain efforts or resources that otherwise would be involved in data extraction. Computing resources used by one or more machines, databases, or networks may be more efficiently utilized or even reduced, e.g., as a result of automatic positivity classifications, triaging, remediation task generation, or integration of tools. Examples of such computing resources may include processor cycles, network traffic, memory usage, graphics processing unit (GPU) resources, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 128. A web client 110 (e.g., a browser) or a programmatic client 108 (e.g., an "app") may be hosted and executed on the user device 106.

An API server 118 and a web server 120 provide respective programmatic and web interfaces to components of the server system 104. A specific application server 116 hosts a vulnerability management system 122, which includes components, modules, or applications.

The user device 106 can communicate with the application server 116, e.g., via the web interface supported by the web server 120 or via the programmatic interface provided by the API server 118. It will be appreciated that, although only a single user device 106 is shown in FIG. 1, a plurality of user devices may be communicatively coupled to the server system 104 in some examples. Further, while certain functions are described herein as being performed at either the user device 106 (e.g., web client 110 or programmatic client 108) or the server system 104, the location of certain functionality either within the user device 106 or the server system 104 may be a design choice. For example, it may be technically preferable to deploy particular technology and functionality within the server system 104 initially, but to migrate this technology and functionality to a programmatic client at a later stage, e.g., when the user device 106 has sufficient processing capacity.

The application server 116 is communicatively coupled to database servers 124, facilitating access to an information storage repository or databases 126. In some examples, the databases 126 include storage devices that store information to be processed or transmitted by the vulnerability management system 122.

The application server 116 accesses application data (e.g., application data stored by the database servers 124) to provide one or more applications to the user device 106 via a web interface 130 or an app interface 132. For example, and as described further below according to examples and with reference to FIGS. 2-8, the application server 116, using the vulnerability management system 122, may provide a vulnerability management application.

In some examples, the vulnerability management application improves the efficiency of vulnerability triaging by automating or streamlining the analysis and processing of security findings. The vulnerability management system 122 may enable the user 128 to register one or more components (e.g., an application in the form of a microservice) and link multiple products (e.g., multiple security tools) to each component. The vulnerability management system 122 may provide a dashboard via the app interface 132 or the web interface 130 that presents vulnerabilities, such as security scan findings, from the various security tools.

Machine learning is used to classify a vulnerability as a true positive or a false positive. The classification of a vulnerability as either a true positive or a false positive is referred to herein as a "positivity classification." In some examples, open vulnerabilities (e.g., those that have not yet been triaged) are automatically fed into the vulnerability management system 122 and the machine learning model performs inference on the open vulnerabilities in order for them to be automatically classified.

A vulnerability management application according to examples described herein may remove tedious processes and expedite security-related decision-making. For instance, the dashboard may provide triaging elements that are user-selectable to confirm or adjust the positivity classification for the vulnerabilities. Furthermore, the vulnerability management system 122 may invoke automatic functions based on the positivity classification for a particular vulnerability and other factors, such as a confidence indicator associated with the positivity classification (e.g., a confidence level). Automatic functions may include automatic triaging of certain vulnerabilities, automatic remediation task generation, or the generation of candidate triaging reasons, as will be described further below.

To access the vulnerability management application provided by the vulnerability management system 122, the user 128 may create an account with an entity associated with the server system 104, e.g., a service provider (or access an existing account with the entity). The user 128 may use account credentials to access the web interface 130 (via a suitable web browser) and request access to the vulnerability management application. The vulnerability management system 122 may automatically create a service instance associated with the vulnerability management application at the application server 116 which can be accessed by the user device 106 via one or more service APIs to utilize functionality described herein. The user 128 may also, in some examples, access the vulnerability management application using a dedicated programmatic client 108, in which case some functionality may be provided client-side and other functionality may be provided server-side.

One or more of the application server 116, the database servers 124, the API server 118, the web server 120, and the vulnerability management system 122, may each be implemented in a computer system, in whole or in part, as described below with respect to FIG. 10. In some examples, third-party applications, such as a third-party application 114a executing on a third-party server 112a or a third-party application 114b executing on a third-party server 112b, can communicate with the application server 116 via the programmatic interface provided by the API server 118. For example, a third-party application may support one or more features or functions on a website or platform hosted by a third party, or may perform certain methodologies and provide input or output information to the application server 116 for further processing or publication. For example, the third-party application 114a may provide a first security tool and the third-party application 114b may provide a second security tool, with both security tools transmitting security findings (e.g., vulnerability reports) to the vulnerability management system 122 for processing.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
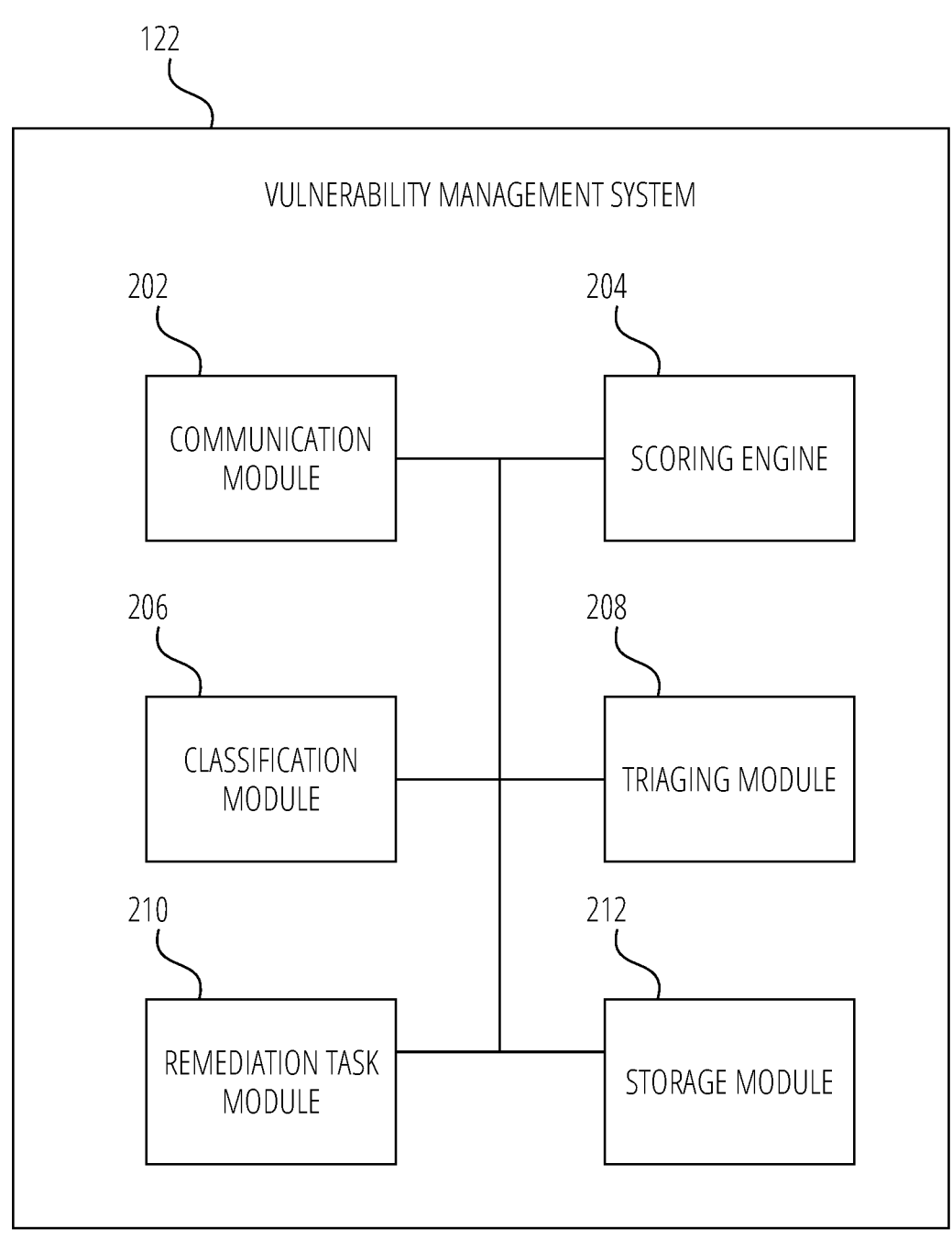
FIG. 2 is a block diagram of a vulnerability management system, according to some examples.

FIG. 2 is a block diagram of a vulnerability management system 122, suitable for automatic classification of vulnerabilities, according to some examples. The vulnerability management system 122 is shown as including a communication module 202, a processor-implemented scoring engine 204, a classification module 206, a triaging module 208, a remediation task module 210, and a storage module 212. The modules shown in FIG. 2 are configured to communicate with each other (e.g., via a bus, shared memory, or a switch) to implement aspects of the vulnerability management application. Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

The communication module 202 receives data sent to the vulnerability management system 122 and transmits data from the vulnerability management system 122. For example, the communication module 202 may receive, from the third-party server 112a and third-party server 112b, vulnerability reports containing descriptions of detected vulnerabilities and other metadata. As another example, the communication module 202 may receive historical triaging data from the databases 126. Further, the communication module 202 may receive user input, such as instructions to link a security tool to the vulnerability management application, via the user device 106. In some examples, the vulnerability management system 122 is configured to receive requests and other data via API calls and return responses and results via the communication module 202, e.g., comprising data objects in the JavaScript Object Notation (JSON) data interchange format.

The scoring engine 204 is responsible for generating a probability score for a vulnerability. The probability score is used, directly or indirectly, to classify the vulnerability as a false positive or a true positive. The scoring engine 204 implements a machine learning model, e.g., a logistic regression model, to generate probability scores. The machine learning model may be trained, using historical triaging data, to predict whether a new vulnerability, as detected by a security tool, is a false positive. Training of machine learning models, according to some examples, is described in further detail with reference to FIG. 7 and FIG. 8 below.

The scoring engine 204 may further be configured to generate input data in a suitable format for processing by the machine learning model. For example, the scoring engine 204 may generate a vector representation based on vulnerability metadata, e.g., a vulnerability description and severity score, which is then fed to the machine learning model.

The classification module 206 is configured to determine the positivity classification for a given vulnerability based on the probability score generated by the machine learning model. As alluded to above, the probability score may be used directly, e.g., where any vulnerability with a probability score of 0.6 or higher is automatically classified as a false positive, or indirectly, e.g., where the probability score is further processed to arrive at a final score. The classification module 206 may cause the positivity classification to be stored in association with the vulnerability, e.g., in the databases 126.

The vulnerability management system 122 may process multiple vulnerabilities. For example, a vulnerability scan may be performed, returning three new vulnerabilities associated with a particular application that is registered with the vulnerability management application. In such a case, each vulnerability may be processed to generate a positivity classification for that vulnerability.

The triaging module 208 is responsible for various triaging-related actions. These actions may include fully automated actions and actions requiring some degree of user input. For example, where a vulnerability is determined to be a false positive and the machine learning model returns the false positive prediction with a confidence level that is higher than a predefined threshold, the triaging module 208 may invoke an automatic triaging function to enable the vulnerability to be triaged, e.g., marked as a false positive with no user input or review required. As another example, where a positivity classification is generated, but the machine learning model returned a result with a confidence level that is below the predefined threshold, the triaging module 208 may cause presentation of a triaging element in a user dashboard, enabling the user 128 to confirm or adjust the positivity classification.

The remediation task module 210 is configured to generate remediation tasks in response to the vulnerability management system 122 detecting true positive (genuine) vulnerabilities. Outputs, such as probability scores, confidence levels, positivity classifications, or remediation tasks, may be stored in the databases 126 via the storage module 212. Output data may be transmitted to the user device 106 by the communication module 202 and presented on a user interface, e.g., the web interface 130 in the form of a dashboard. An example of such a dashboard is described below with reference to FIGS. 3 and 6. Communications sent and received by the communication module 202 may be intermediated by the network 102.

Figure 3:
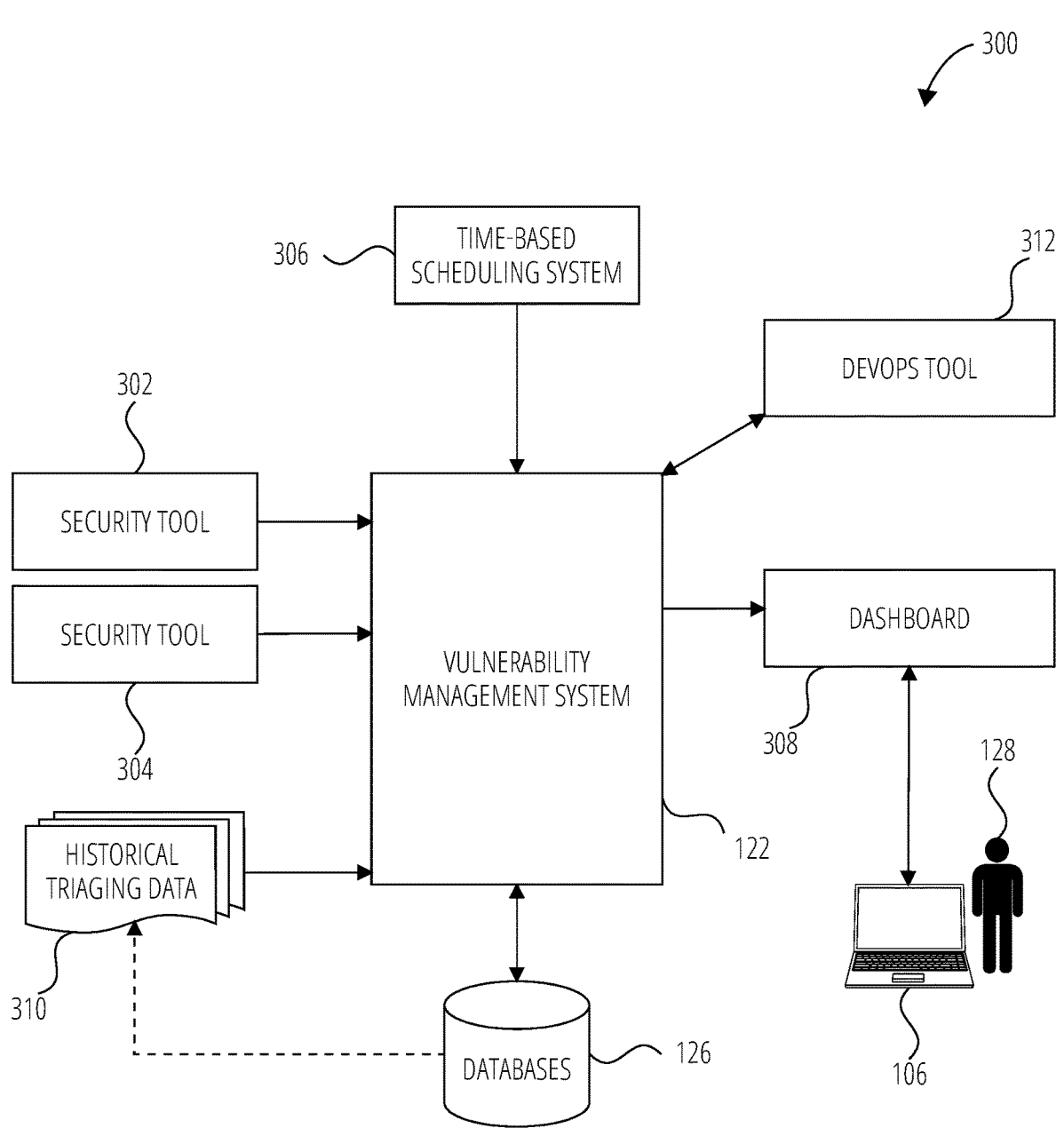
FIG. 3 is an interaction diagram showing certain interactions between a vulnerability management system, multiple security tools, and other components, according to some examples.

FIG. 3 is an interaction diagram 300 showing certain interactions involving the vulnerability management system 122, according to some examples. The interaction diagram 300 shows two security tools 302 and 304 that are communicatively coupled to the vulnerability management system 122.

The security tools 302 and 304 may be two different security scanning tools that are used to monitor the security of the same application (e.g., a microservice that is in the process of being deployed). In the context of software development, for example, a continuous integration process may be followed, where code changes are integrated with different security tools. Examples of the present disclosure allow for scan results from such different security tools to be imported to a central, common repository and efficiently analyzed to provide a user-friendly vulnerability management system 122.

A time-based scheduling system 306, such as a "cron" job scheduler, triggers the checking for, and accessing of, open vulnerabilities. A recurring execution may be scheduled to pull a set of latest security scan reports from different platforms, e.g., from the security tool 302 and the security tool 304, for processing by the vulnerability management system 122 and storage of results in the databases 126. Processing of new vulnerabilities may include performing inference on them, using the machine learning model, to classify them as true positives or false positives. Output data, including classifications, are presented to the user 128 via a user interface, including a dashboard 308 that is accessible on the user device 106.

The dashboard 308 may provide the user 128 with a flexible, yet powerful, vulnerability management tool. The user 128 may provide user input to register several components, e.g., several applications that are each monitored by different security tools, with the vulnerability management application. It will be appreciated that the required user credentials, security tokens, or the like, may be provided by the user 128 in order to connect the components or security tools in question to the vulnerability management system 122.

For example, the user 128 may register a microservice with the vulnerability management application and link the security tool 302 and the security tool 304 to the microservice within the vulnerability management system 122, given that the security tools 302 and 304 have both been set up to monitor the microservice. The time-based scheduling system 306 may trigger a job, e.g., every five minutes or every thirty minutes, instructing the vulnerability management system 122 to check for new vulnerabilities reported by the security tool 302 or the security tool 304 with respect to the registered microservice. Any new vulnerabilities, together with positivity classifications and other information or selectable options (as will be described further below), are then presented to the user in the dashboard 308.

A recurring execution may also schedule other functionality of the vulnerability management system 122, such as the "self-healing" function referred to above, that automatically triages a false positive vulnerability. The user device 106 may be used to adjust various settings via the user interface on the user device 106. Using the "self-healing" function as an example, the user 128 may set a threshold for the automatic triaging function, or may select an option that instructs the vulnerability management system 122 to auto-triage all vulnerabilities, irrespective of their probability scores or associated confidence levels.

The databases 126 may store information such as registered components (e.g., applications and security tools registered to the account of the user 128), security tool configurations, scan histories, vulnerability results, machine learning model predictions including positivity classifications, or confidence level data. The databases 126 may also store remediation tasks and triage status information, e.g., for a particular vulnerability, an indication of whether the vulnerability has been triaged and, if so, further information such as a triaging reason.

Historical triaging data 310 may be fed from the databases 126 to the vulnerability management system 122, e.g., to train or retrain a machine learning model (as is further described with reference to FIG. 7 and FIG. 8). The historical triaging data 310 may include, for example, a vulnerability description, a severity score, a triaging status, and a triaging reason stored in association with a given vulnerability.

FIG. 3 further shows the vulnerability management system 122 as connected to a DevOps tool 312 (the term "DevOps" should be understood to refer to a combination of the terms "development" and "operations"). Where the vulnerability management system 122 is used to manage vulnerabilities associated with software development projects, for example, the vulnerability management system 122 may communicate with one or more DevOps tools. For instance, and as described further with reference to FIG. 6 below, a remediation task may be automatically generated by the vulnerability management system 122 and communicated to the DevOps tool 312 in order to trigger a task to make appropriate code changes. In some examples, the vulnerability management system 122 may be configured to cause automatic generation of a remediation task within an external tool (e.g., a task generated within a project management tool, such as JIRA™, Trello™, or Basecamp™) if a true positive vulnerability is detected with a severity score that is above a predefined severity threshold.

FIG. 4 is a flowchart illustrating operations of a method suitable for automatic classification of vulnerabilities, according to some examples. By way of example and not limitation, aspects of the method 400 may be performed by the modules, components or databases shown in FIGS. 1-3. The method 400 utilizes a machine learning model in the example form of a logistic regression model for aspects of the automatic classification of vulnerabilities.

The method 400 commences at opening loop element 402 and proceeds to operation 404, where the vulnerability management system 122 accesses a data record of a vulnerability generated by a security tool. For example, the security tool 302 may generate a security finding report that includes details of a detected vulnerability. The data record accessed by the vulnerability management system 122 includes a vulnerability description and a severity score. The vulnerability description is a natural language text description including one or more text objects that describe the vulnerability, while the severity score is a numerical score (e.g., a score in a range from 1 to 10, with ten being the most severe vulnerability).

At operation 406, the scoring engine 204 pre-processes the data record. In some examples, the vulnerability description is pre-processed to remove one or more predefined text objects. This may include automatically removing stop words, special characters, or other predefined words, such as non-English words. A "stop word" refers to a commonly used word that is automatically excluded from text analysis, typically because it does not carry significant meaning or importance. Examples of stop words in the English language include "a," "an," "the," "and," "in," "on," "of," and "for." The scoring engine 204 may filter out the aforementioned words automatically to avoid skewing results of the machine learning model. Pre-processing may include additional steps, such as converting text to lowercase or uppercase. The output of the pre-processing task is a pre-processed vulnerability description.

The method 400 then proceeds to operation 408, where an input vector for the logistic regression model is automatically generated based on the vulnerability description and the severity score. The input vector may be generated by the logistic regression model, or by another component in the scoring engine 204, such as a dedicated feature extractor or generator.

A natural language processing algorithm is applied to the pre-processed vulnerability description to convert the vulnerability description to a numerical representation, and the numerical severity score is added to the aforementioned numerical representation as an additional input feature. For example, a bag-of-words algorithm may be applied to the string representing the pre-processed vulnerability description to obtain the numerical representation. When employing a bag-of-words algorithm, the numerical representation represents each text object (e.g., word) as an input feature and further represents a frequency of the text object within the vulnerability description as a feature value.

In some examples, a dictionary (or vocabulary) may be created within the vulnerability management system 122 and associated with the logistic regression model. The dictionary maps each index in an input vector to a specific word. For example, during model training, a large number of descriptions (e.g., thousands) may be analyzed to create a dictionary including all the words from among the descriptions (after pre-processing). The logistic regression model learns a weight for each entry in the feature vector. When it encounters a new vulnerability during inference, the model (or another component) constructs a feature vector for that vulnerability by counting the occurrence of each word and assigning the count to the corresponding entry in the feature vector. When a particular vulnerability is analyzed for inference, the count may be deemed to be zero for all words in the dictionary that do not appear in the vulnerability description in question, while the count for the words that do appear in the vulnerability description correspond to their respective frequencies in the vulnerability description. If the text description contains a word that is not present in the vocabulary used during training, then the feature vector will not have a corresponding entry in the vector of the logistic regression model. In this case, the model may ignore the count for the missing word, effectively treating it as if it has a count of zero.

As mentioned, the severity score is automatically considered by the logistic regression model. Accordingly, in some examples, the input vector includes the vector representation of the pre-processed vulnerability description (e.g., the result of the bag-of-words algorithm) with the severity score added as an input feature. The severity score is thus added as an additional input feature, with the value of the input feature being the numerical score, resulting in a final input vector in the form of a 1×m dimensional vector, where m is the number of unique words in the vulnerability description plus one (to account for the severity score).

The machine learning model uses the input vector to generate a probability score for the vulnerability at operation 410. The logistic regression model may be trained to generate output in the form of a score between 0 and 1. At operation 412, the classification module 206 determines the positivity classification for the vulnerability by assessing the probability score based on predefined rules. For example, if the probability score is above a threshold of 0.6, the vulnerability is automatically classified as a false positive, while it is automatically classified as a true positive if the probability score is equal to or below 0.6. However, it will be appreciated that such a threshold may be varied or may depend on the implementation. (It will also be appreciated that, in other examples, the machine learning model may be trained to output a binary classification of the vulnerability as being either a true positive or a false positive.)

In some examples, a confidence indicator in the form of a percentage-based confidence level is determined as follows:

```
if false positive:
    confidence level = probability score × 100; or
if true positive:
    confidence level = (1 − probability score) × 100.
```

The method 400 includes presenting, in a user interface, output data representing the positivity classification for the vulnerability (operation 414). The output data may include details of the vulnerability, e.g., its description or severity score, together with the positivity classification and the calculated confidence indicator.

The output data may include various other data and graphical elements, e.g., presented via the dashboard 308, such as triaging indicators or suggested triaging reasons, as will be further described below. The output data generated for a particular vulnerability may depend on a number of factors, such as the positivity classification, the confidence level, or user-defined settings.

In some examples, a triaging element is presented with the details of the vulnerability to enable a user to confirm or adjust, through user input, the positivity classification (operation 416). However, in some cases, in response to determining that the positivity classification for the vulnerability indicates a false positive, the vulnerability management system 122 may automatically flag the vulnerability as a false positive, complete triaging without user input, and present an automatic triaging indicator in the dashboard 308.

In response to determining that the positivity classification for the vulnerability indicates a true positive, the vulnerability management system 122 may further automatically generate a remediation task corresponding to the vulnerability. Remediation tasks may be stored in association with the vulnerability, e.g., in the databases 126, and the status of each remediation task may be automatically tracked within the vulnerability management system 122, or using an external tool such as the DevOps tool 312. The method 400 ends at closing loop element 418.

While examples of the present disclosure refer to the severity score as being a numerical score, the term "score" may refer to any suitable score or rating, e.g., a numerical score, a percentage-based score, a level, or a grading. A score may also be provided in the form of a classification (e.g., "low severity" or "high severity") or a range (e.g., 60%-75%). Scores may be generated using continuous (interval) scales, binary scales, or combinations thereof. Accordingly, it will be appreciated that numerous types of scores, grades, classifications, or the like may be employed.

Figure 5:
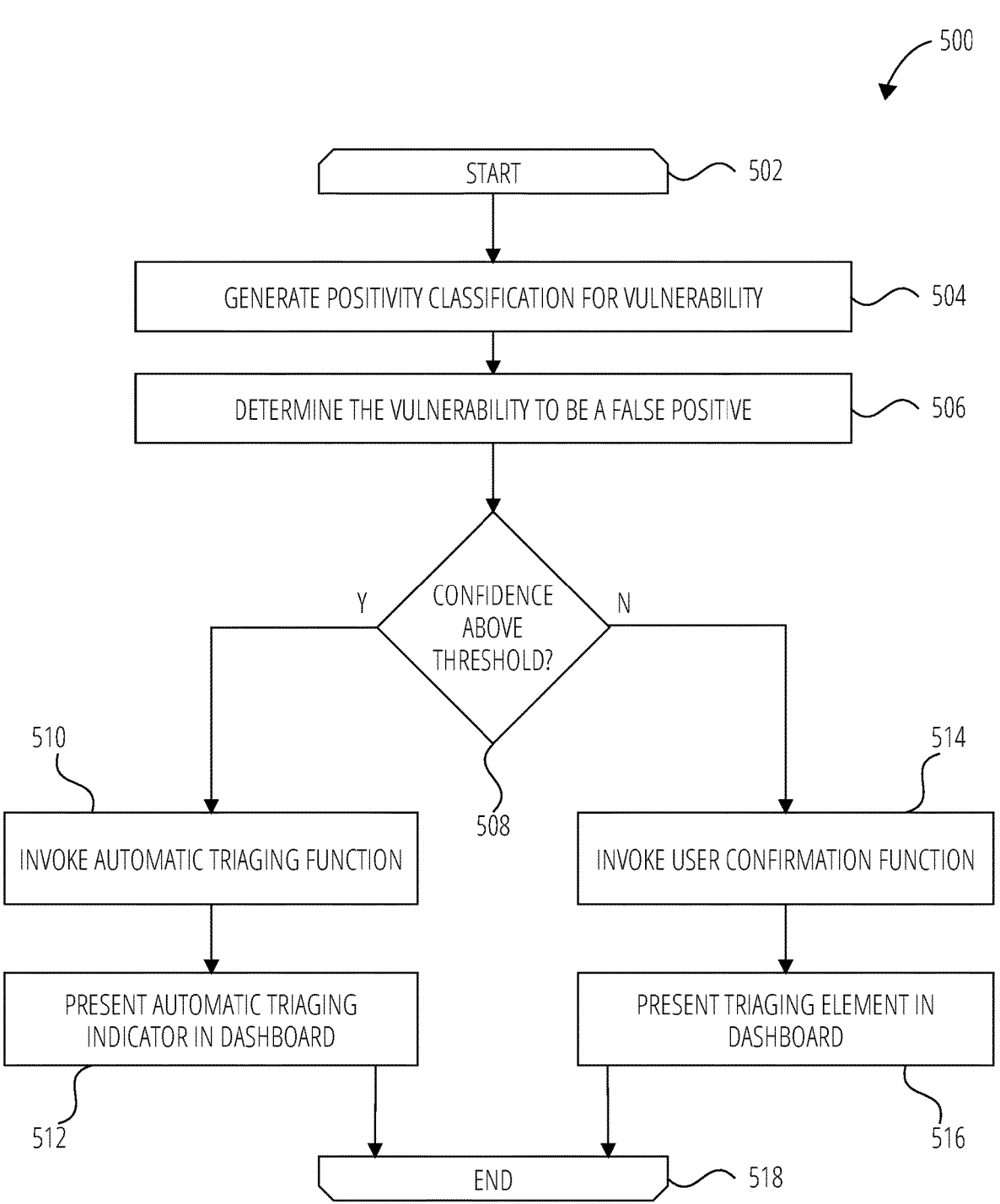
FIG. 5 is a flowchart illustrating operations of a method suitable for initiating different triaging functions based on a positivity classification determined for a vulnerability, according to some examples.

FIG. 5 is a flowchart illustrating operations of a method 500 suitable for initiating different triaging functions based on a positivity classification determined for a vulnerability, according to some examples. By way of example and not limitation, aspects of the method 500 may be performed by the modules, components, or databases shown in FIGS. 1-3.

The method 500 commences at opening loop element 502 and proceeds to operation 504, where a positivity classification is generated for a vulnerability. For example, the vulnerability may be a vulnerability identified by the security tool 302 of FIG. 3, and the positivity classification may be based on a probability score generated by the scoring engine 204 of FIG. 2 using a trained logistic regression model.

The vulnerability management system 122 determines the vulnerability to be a false positive at operation 506, e.g., using the classification module 206 as described above. Turning now to decision operation 508, the vulnerability management system 122 determines whether a confidence level associated with the determined positivity classification exceeds a predefined threshold, e.g., a threshold of 60%. If the confidence level exceeds the threshold, the vulnerability management system 122 invokes an automatic triaging function at operation 510.

In response to invoking of the automatic triaging function, the vulnerability management system 122 automatically triages the vulnerability by flagging it as a false positive and not generating any remediation tasks for the user 128. In other words, the vulnerability is automatically cleared (e.g., an open vulnerability may become classified as closed) based on the fact that the false positive has been determined with a high level of confidence. At operation 512, an automatic triaging indicator may be presented to the user 128, e.g., by displaying a suitable notification in the dashboard 308 when the user 128 accesses the web interface 130 on the user device 106.

Referring again to decision operation 508, if the confidence level is equal to or below the threshold (e.g., at or below 60%), the vulnerability management system 122 does not automatically finalize triaging. Instead, the vulnerability management system 122 invokes a user confirmation function (operation 514). When the user confirmation function is invoked, the positivity classification generated by the vulnerability management system 122 may be presented to the user 128 for review. For example, and as shown at operation 516 in FIG. 5, a triaging element may be presented in the dashboard 308 with an indication that the vulnerability has been predicted to be a false positive, together with the confidence level. One or more candidate triaging reasons may also be generated and presented to the user, e.g., based on historical triaging data stored in the databases 126. For example, in the case of a false positive, the vulnerability management system 122 may automatically extract, from data records in the databases 126, two or three triaging reasons most commonly provided or selected for false positive vulnerabilities with similar details, such as similar vulnerability descriptions or severity scores. The user 128 may review the candidate triaging reasons (e.g., the proposed reasons why the vulnerability should be marked as a false positive) and select one or more of them via the dashboard 308, thereby facilitating the triaging process.

The user 128 may further provide user input to confirm or adjust the positivity classification. User selections, such as a triaging reason and a selected positivity classification, are stored in the databases 126 as a final set of triaging data. If the user 128 provides user input to adjust the positivity classification to a true positive (genuine vulnerability), the vulnerability management system 122 may automatically generate additional output, such as proposed remediation tasks. The method concludes at closing loop element 518.

Figure 6:
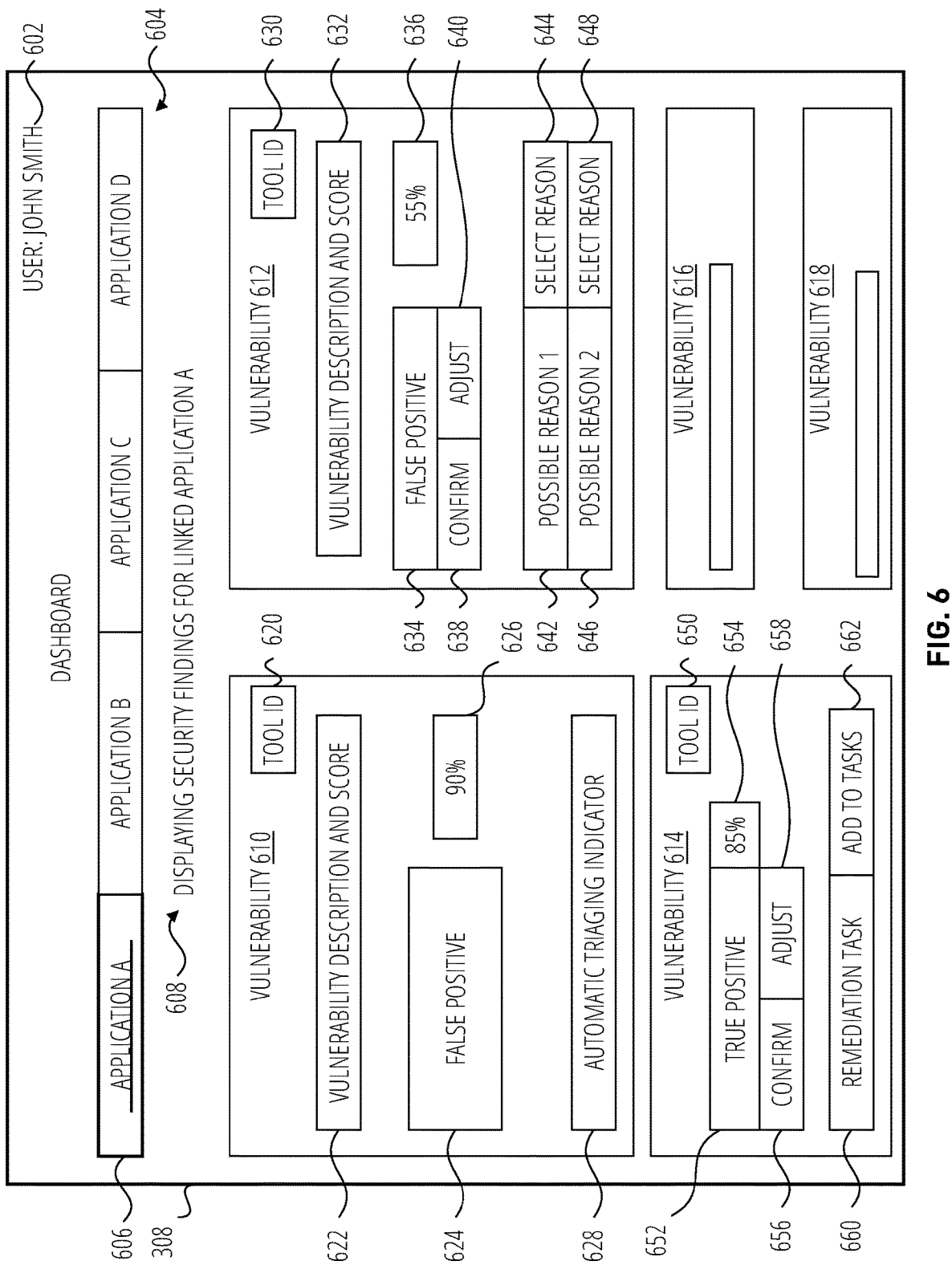
FIG. 6 is a diagram illustrating aspects of a dashboard that may be presented in a user interface, according to some examples.

FIG. 6 is a diagram illustrating aspects of the dashboard 308 of FIG. 3, according to some examples. The dashboard 308 may be presented to a user via a user interface on any suitable device, e.g., the user device 106 of FIG. 1. The dashboard 308 may provide a user with a unified or integrated view of vulnerabilities, thereby reducing or obviating the need for triaging from multiple interfaces or dashboards. Additionally, the dashboard 308 may offer customization and recommendations for a variety of security scanning tools to facilitate locating and addressing of security concerns.

The dashboard 308 includes a user identifier 602 that identifies the account of the user ("John Smith") who is accessing the vulnerability management application. As mentioned above, the user is able to register several components with the vulnerability management application and, for each component, link one or more security tools to the component. In FIG. 6, and merely as an example, the user has registered four software applications with the vulnerability management application. The dashboard 308 includes a set of applications tabs 604 allowing the user to navigate between the registered components. In FIG. 6, a tab 606 representing "Application A" is shown as selected (as is visually indicated by the enlarged border of the tab 606), and the dashboard 308 displays vulnerabilities associated with "Application A." The user may navigate to vulnerabilities associated with "Application B," "Application C," or "Application D," by selecting the appropriate tab from among the applications tabs 604.

The dashboard 308 further includes, below the applications tabs 604, a header 608 that provides the following indication to the user: "Displaying security findings for linked Application A." As mentioned above, a recurring execution may be scheduled to pull a set of latest security scan reports from different platforms. Each report may include a data record for each vulnerability detected, including information such as a vulnerability identifier (ID), an identifier of the component (e.g., application) in which the vulnerability was detected, a vulnerability description, and a severity score (or other indication of severity or risk). In some examples, the user may also use the dashboard 308 to submit a request to update ("refresh") vulnerability information, in response to which the vulnerability management system 122 initiates retrieval and display of the latest results.

Once the reports have been processed by the vulnerability management system 122, including inference by the machine learning model and automatic positivity classification, vulnerabilities for "Application A" are presented in the dashboard 308. Merely as an example, the dashboard 308 shows five vulnerabilities 610, 612, 614, 616, and 618. The vulnerability 610 (identified as a false positive), the vulnerability 612 (also identified as a false positive), and the vulnerability 614 (identified as a true positive) are described further below to illustrate certain aspects of the dashboard 308.

Details of the vulnerability 610 are displayed in the dashboard 308. A security tool identifier 620 identifies the security tool that detected the vulnerability 610. As mentioned, the user is enabled to link multiple security tools to an application and the dashboard 308 thus provides the user with a consolidated view of vulnerabilities originating from different detection sources. A vulnerability description and severity score 622 are displayed, and a false positive notification 624 indicates to the user that the vulnerability management system 122 has determined the vulnerability detected by the relevant security tool to be a false positive. A confidence level 626 in the example form of a percentage (90%) is displayed adjacent to the false positive notification 624.

In this example, the user settings instruct the vulnerability management system 122 to perform automatic triaging if a false positive is detected with a confidence level of above 60%. The vulnerability management system 122 automatically finalizes triaging and displays an automatic triaging indicator 628 in the dashboard 308. This indicates to the user that the vulnerability 610 has been flagged as a false positive and that no manual triaging is required from the user. This may reduce manual steps required and improve overall triaging efficiency. A triaging status may also be shown, e.g., indicating that the vulnerability 610 has been triaged and closed. In some examples, a vulnerability may be removed from the dashboard 308 once it has been closed.

Details of the vulnerability 612 are displayed in the dashboard 308. A security tool identifier 630 identifies the security tool that detected the vulnerability 612. A vulnerability description and severity score 632 are displayed, and a false positive notification 634 indicates to the user that the vulnerability management system 122 has determined the vulnerability detected by the relevant security tool to be a false positive. A confidence level 636 in the example form of a percentage (55%) is displayed adjacent to the false positive notification 634.

In this example, because the confidence level 636 is below the threshold of 60%, the user is required to confirm or adjust the positivity classification by selecting a confirm button 638 or an adjust button 640 in the dashboard 308 (e.g., the vulnerability has an "open" status until the user has confirmed or adjusted the model's prediction). The vulnerability management system 122 further generates, based on historical data, and as described above, two candidate triaging reasons 642 and 646. The user is able to select one or both reasons using the select reason button 644 and the select reason button 648.

Details of the vulnerability 614 are also displayed in the dashboard 308. A security tool identifier 650 identifies the security tool that detected the vulnerability 614. In this example, the security tools identified by the security tool identifier 620, the security tool identifier 630, and the security tool identifier 650, respectively, are different IT security tools provided by unrelated third-party applications linked to the vulnerability management system 122. For example, "Application A" may be a microservice that is being developed and is undergoing security validation involving three different security tools.

A vulnerability description and severity score (not shown) may be displayed for the vulnerability 614, and a true positive notification 652 indicates to the user that the vulnerability management system 122 has determined the vulnerability detected by the relevant security tool to be genuine. A confidence level 654 in the example form of a percentage (85%) is displayed adjacent to the true positive notification 652. The user is enabled to confirm or adjust the positivity classification by selecting a confirm button 656 or an adjust button 658 in the dashboard 308.

The vulnerability management system 122 further generates, based on historical data and an analysis of the vulnerability description and severity score, a suggested remediation task to address the vulnerability 614. A remediation task notification 660 is presented in association with the vulnerability 614 and the user is able to select an add to tasks button 662 to cause the suggested remediation task to be stored in the databases 126 and automatically added to a task list provided by the vulnerability management system 122.

Using software development as an example, the vulnerability management system 122 may be integrated with or connected to one or more DevOps tools. For instance, the generation of the remediation task may involve triggering generation of an appropriate task in a software project management tool, such as JIRA™, or in a Source Code Management (SCM) system. As discussed with reference to FIG. 3, a DevOps tool 312 may be in communication with the vulnerability management system 122. Once the relevant task has been performed to address the vulnerability 614, the vulnerability management system 122 may receive or access a notification from the DevOps tool 312 and update a status of the vulnerability 614 within the vulnerability management system 122, thereby also causing the dashboard 308 to be updated to reflect the remediation.

Figure 7:
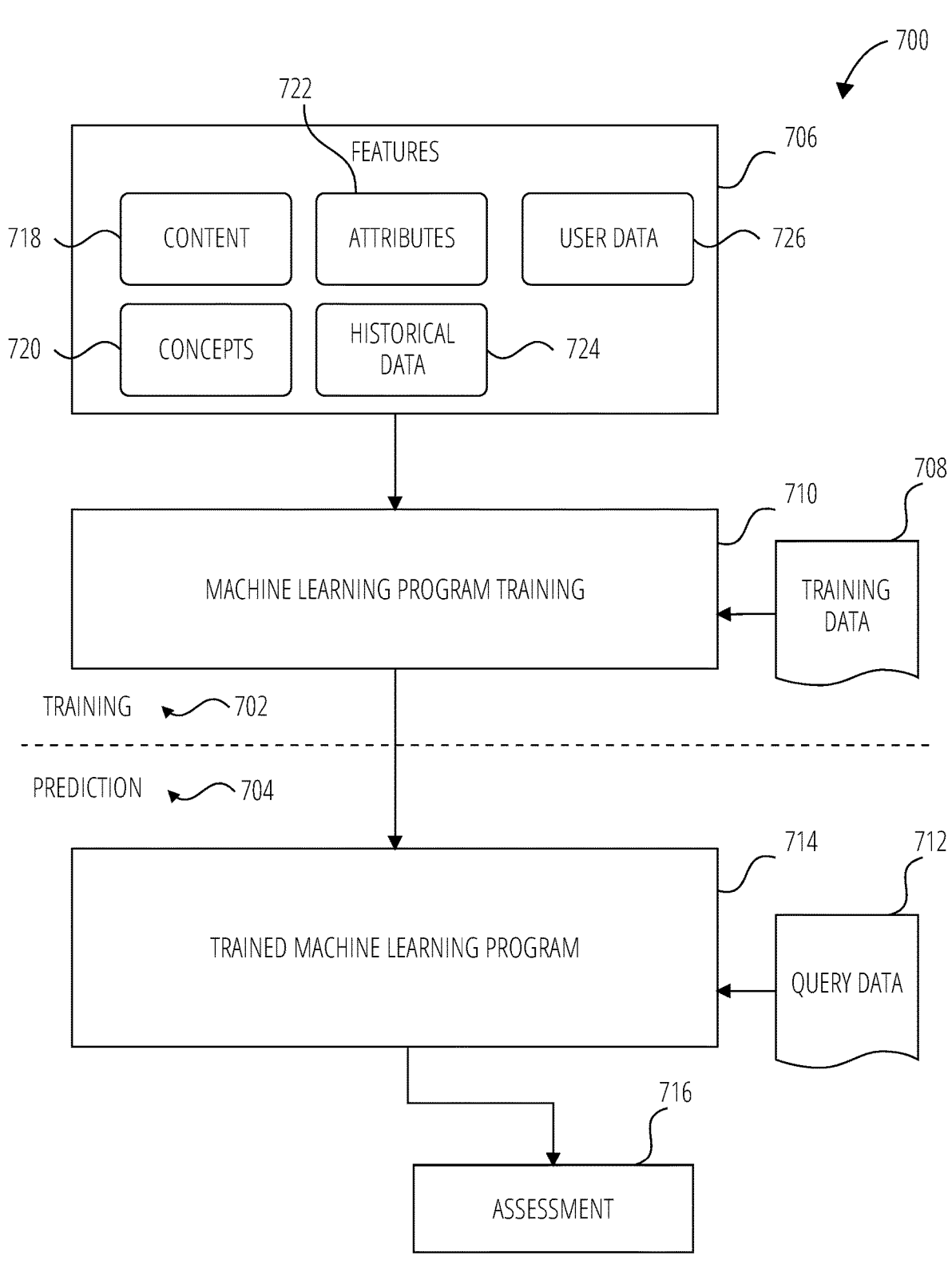
FIG. 7 diagrammatically illustrates training and use of a machine learning program, according to some examples.

FIG. 7 generally illustrates certain aspects of training and use of a machine learning program, according to some examples. Specifically, FIG. 7 is a block diagram showing a machine learning tool 700, according to some examples. Machine learning tools such as the machine learning tool 700, also referred to as machine learning algorithms or programs, may be used as part of the systems and methodologies described herein to perform operations associated with assessment and classification of vulnerability in the IT security context.

Machine learning tools operate by building a model from example training data 708, also referred to as training sets, in order to make data-driven predictions or decisions expressed as outputs or assessments (e.g., assessment 716). Although examples are presented with respect to a few machine learning tools, the principles presented herein may be applied to other machine learning tools.

One of ordinary skill in the art will be familiar with several machine learning tools that may be applied with the present disclosure, including logistic regression (which is described further below with reference to FIG. 8), linear regression, Naive-Bayes, random forests, decision tree learning, neural networks, deep neural networks, genetic or evolutionary algorithms, matrix factorization, support vector machines (SVM), and the like.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning tool 700 supports two types of phases, namely a training phase 702 and prediction phase 704. In training phases 702, supervised learning, unsupervised or reinforcement learning may be used. For example, the machine learning tool 700 (1) receives features 706 (e.g., as structured or labeled/annotated data in supervised learning) or (2) identifies features 706 (e.g., unstructured or unlabeled data for unsupervised learning) in training data 708. In prediction phases 704, the machine learning tool 700 uses the features 706 for analyzing query data 712 to generate outcomes or predictions, as examples of an assessment 716.

In the training phase 702, feature engineering may be used to identify features 706 and may include identifying informative, discriminating, and independent features for the effective operation of the machine learning tool 700 in pattern recognition, classification, and regression. In some examples, the training data 708 includes labeled data, which is known data for pre-identified features 706 and one or more outcomes. In the context of a machine learning tool, each of the features 706 may be a variable or attribute, such as individual measurable property of a process, article, system, or phenomenon represented by a data set (e.g., the training data 708). Features 706 may also be of different types, such as numeric features, strings, and graphs, and may include one or more of content 718, concepts 720, attributes 722, historical data 724, or user data 726, merely for example.

In training phases 702, the machine learning tool 700 may use the training data 708 to find correlations among the features 706 that affect a predicted outcome or assessment 716. With the training data 708 and the identified features

706, the machine learning tool 700 is trained during the training phase 702 at machine learning program training 710. The machine learning tool 700 appraises values of the features 706 as they correlate to the training data 708. The result of the training is the trained machine learning program 714 (e.g., a trained or learned model).

Further, the training phases 702 may involve machine learning, in which the training data 708 is structured (e.g., labeled during preprocessing operations), and the trained machine learning program 714 may implement a neural network capable of performing, for example, classification and clustering operations. In other examples, the training phase 702 may involve deep learning, in which the training data 708 is unstructured, and the trained machine learning program 714 implements a deep neural network that is able to perform both feature extraction and classification/clustering operations.

A neural network generated during the training phase 702, and implemented within the trained machine learning program 714, may include a hierarchical (e.g., layered) organization of neurons. For example, neurons (or nodes) may be arranged hierarchically into a number of layers, including an input layer, an output layer, and multiple hidden layers. Each of the layers within the neural network can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron. In some examples, the neural network may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), merely for example.

A machine learning model may be run against training data for several epochs, in which the training data is repeatedly fed into the model to refine its results. In each epoch, the entire training data set is used to train the model. Multiple epochs (e.g., iterations over the entire training data set) may be used to train the model. In some examples, the number of epochs is 10, 100, 500, or 1000. Within an epoch, one or more batches of the training data set are used to train the model. Thus, the batch size ranges between 1 and the size of the training data set while the number of epochs is any positive integer value. The model parameters are updated after each batch (e.g., using gradient descent).

Each model may develop a rule or algorithm over several epochs by varying the values of one or more variables affecting the inputs to more closely map to a desired result, but as the training data set may be varied, and is preferably very large, perfect accuracy and precision may not be achievable. A number of epochs that make up a training phase 702, therefore, may be set as a given number of trials or a fixed time/computing budget, or may be terminated before that number/budget is reached when the accuracy of a given model is high enough or low enough or an accuracy plateau has been reached. For example, if the training phase 702 is designed to run n epochs and produce a model with at least 95% accuracy, and such a model is produced before the nth epoch, the training phase 702 may end early and use the produced model satisfying the end-goal accuracy threshold. Similarly, if a given model is inaccurate enough to satisfy a random chance threshold (e.g., the model is only 55% accurate in determining true/false outputs for given inputs), the training phase 702 for that model may be terminated early, although other models in the training phase 702 may continue training. Similarly, when a given model continues to provide similar accuracy or vacillate in its results across multiple epochs—having reached a performance plateau—the training phase 702 for the given model may terminate before the epoch number/computing budget is reached.

Once the training phase 702 is complete, a model is finalized. In some examples, models that are finalized are evaluated against testing criteria. In a first example, a testing data set that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

During prediction phases 704, the trained machine learning program 714 is used to perform an assessment. Query data 712 is provided as an input to the trained machine learning program 714, and the trained machine learning program 714 generates the assessment 716 as output, responsive to receipt of the query data 712.

As described above, in some examples, the trained machine learning program suitable for use in automatic assessment or classification of vulnerabilities is a logistic regression model. The diagram 800 in FIG. 8 illustrates training and use of a logistic regression model 802 to generate probability scores, according to some examples. As shown in FIG. 8, the classification module 206 of FIG. 2 may be deployed with the logistic regression model 802.

Historical triaging data may be used to train the logistic regression model 802. Historical triaging data may be exported from various security tools. A training data set may, for example, include thousands of training records, each containing the following:

Vulnerability identifier;
  Vulnerability description;
  Severity level (e.g., numerical score);
  Triaging status; and
  Triaging reason.
Data Pre-Processing The training data may be pre-processed to remove certain records, e.g., those with empty fields. For example, if a vulnerability was triaged without providing a triaging reason, or if a vulnerability does not have an adequate description, the relevant record may be removed to reduce the risk of obtaining a trained model that provides inaccurate or misleading predictions (e.g., to avoid including records that were not properly analyzed or reviewed before triaging). Furthermore, and as described above, certain text may be removed during pre-processing, e.g., stop words may be removed from the relevant records to avoid skewing the logistic regression model 802. Additional pre-processing may include removing special characters from descriptions or converting all text to the same case (e.g., lowercase) to avoid identical words incorrectly being interpreted or counted as different words based on case discrepancies.

Figure 8:
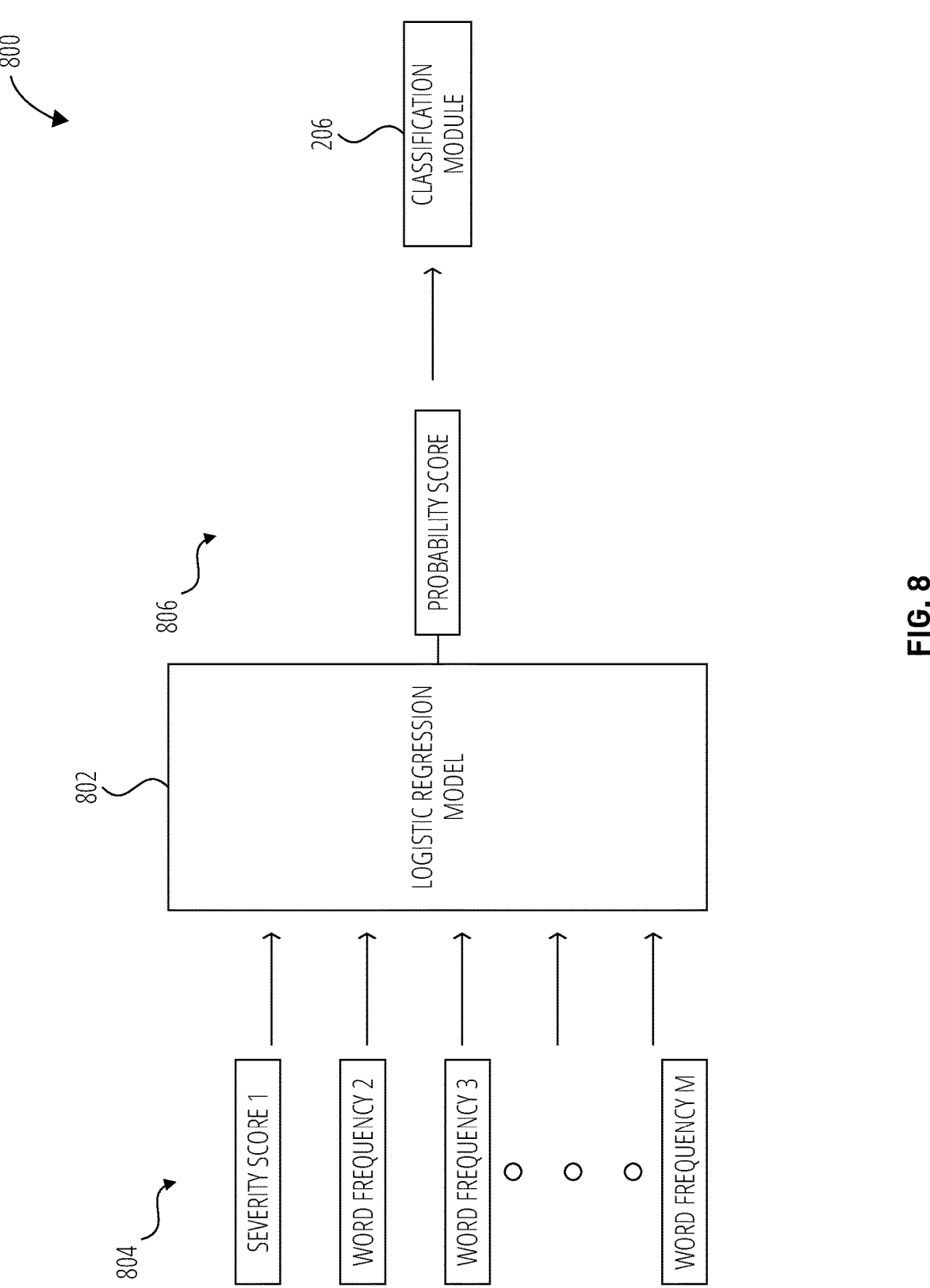
FIG. 8 diagrammatically illustrates training and use of a logistic regression model to generate probability scores, according to some examples.

In the example of FIG. 8, numerical representations are generated using a bag-of-words algorithm. The bag-of-words algorithm is a feature extraction tool that can be applied to text. As described with reference to FIG. 4, this algorithm allows for the representation of text data in numerical form. Each word is an input feature and the frequency of each word is a corresponding frequency value. The training data set may then be separated to create a train-test split. For example, the training data set may be split into training data and testing data in a 70:30 ratio, e.g., if 10,000 training records are used, 7,000 of them are used for training and 3,000 are used for testing to check the performance or accuracy of the logistic regression model 802.

Training

The pre-processed data is used to train the logistic regression model 802 to classify any data record as a true positive or false positive. Input to the logistic regression model 802 during training may include an n×m dimensional matrix, where n is the number of vulnerability data records in the input sample, and m is the number of input features. As explained above, the input features may include both the vulnerability severity score and the frequency of words in the vulnerability descriptions.

In this example, the output parameter in training is 1 for a false positive and 0 for a true positive. In this way, the logistic regression model 802 may be trained to generate a probability score in the range of 0 to 1, with the probability score indicating whether the data record is predicted to relate to a true positive or a false positive.

Model Inference

Pre-processed vulnerability information for a particular vulnerability is used for inference once the logistic regression model 802 has been trained (pre-processing may include the actions mentioned above, such as stop word elimination and converting text to numerical representations). The logistic regression model 802 is fed with an input query in the example form of a 1×m input vector 804, as shown in FIG. 8, where m is the number of unique words in the information for the particular vulnerability, plus one for its severity score.

The probability score output by the logistic regression model 802 as model output 806 is processed by the classification module 206 to generate the positivity classification for the particular vulnerability. Positivity classifications generated for each vulnerability by the logistic regression model 802 may be stored, e.g., in the databases 126, for use in further training, fine-tuning, or retraining of the logistic regression model 802.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors configured by the instructions to perform operations comprising: accessing a data record of a vulnerability, the data record generated by an information technology (IT) security tool and comprising a vulnerability description; automatically generating an input vector based on the vulnerability description; generating, by a machine learning model and using the input vector, a probability score for the vulnerability; automatically determining, based on the probability score for the vulnerability, a positivity classification for the vulnerability; and causing presentation, in a user interface, of output data representing the positivity classification for the vulnerability.

In Example 2, the subject matter of Example 1 includes, wherein the positivity classification indicates that the vulnerability is a false positive, the operations further comprising: generating a confidence indicator associated with the positivity classification for the vulnerability; and based on the positivity classification and the confidence indicator for the vulnerability, invoking an automatic triaging function.

In Example 3, the subject matter of Example 2 includes, wherein the invoking of the automatic triaging function comprises: detecting that the confidence indicator associated with the positivity classification for the vulnerability is above a threshold; and in response to detecting that the confidence indicator is above the threshold, invoking the automatic triaging function to triage the vulnerability automatically and to include an automatic triaging indicator in the output data.

In Example 4, the subject matter of Examples 1-3 includes, wherein the positivity classification indicates that the vulnerability is a false positive, the operations further comprising: accessing historical triaging data stored in a database; generating, based on the historical triaging data, one or more candidate triaging reasons for the false positive; and automatically including the one or more candidate triaging reasons in the output data.

In Example 5, the subject matter of Examples 1-4 includes, wherein the data record of the vulnerability further comprises a severity score, the input vector being generated based on the vulnerability description and the severity score.

In Example 6, the subject matter of Example 5 includes, wherein the generating of the input vector comprises: applying a natural language processing algorithm to one or more text objects in the vulnerability description to obtain a numerical representation of the one or more text objects; and generating the input vector based on the severity score and the numerical representation of the one or more text objects.

In Example 7, the subject matter of Example 6 includes, wherein the natural language processing algorithm is a bag-of-words algorithm, the numerical representation of the one or more text objects representing each text object as an input feature and further representing a frequency of the text object within the vulnerability description as a feature value.

In Example 8, the subject matter of Examples 6-7 includes, prior to applying the natural language processing algorithm: pre-processing the vulnerability description to remove one or more predefined text objects from the vulnerability description to obtain a pre-processed vulnerability description, wherein the pre-processed vulnerability description is used to generate the input vector.

In Example 9, the subject matter of Examples 1-8 includes, wherein the machine learning model is a logistic regression model.

In Example 10, the subject matter of Examples 1-9 includes, wherein the causing presentation of the output data further comprises causing presentation, in the user interface, of a confidence indicator in association with the positivity classification for the vulnerability.

In Example 11, the subject matter of Examples 1-10 includes, the operations further comprising: causing presentation of a triaging element in the user interface, the triaging element being user-selectable to adjust the positivity classification for the vulnerability.

In Example 12, the subject matter of Examples 1-11 includes, wherein the positivity classification indicates that the vulnerability is a true positive, the operations further comprising: in response to the determining of the positivity classification for the vulnerability, automatically generating a remediation task corresponding to the vulnerability; storing the remediation task in association with the vulnerability in a database; and causing presentation of the remediation task in the user interface.

In Example 13, the subject matter of Examples 1-12 includes, wherein the data record of the vulnerability identifies an application, the vulnerability having been detected in the application by the IT security tool.

In Example 14, the subject matter of Example 13 includes, wherein the vulnerability is a first vulnerability, wherein the IT security tool is a first IT security tool, wherein the vulnerability description is a first vulnerability description, wherein the input vector is a first input vector, and wherein the output data is first output data, the operations further comprising: accessing a data record of a second vulnerability generated by a second IT security tool, the data record of the second vulnerability comprising a second vulnerability description and identifying the application, the second vulnerability having been detected in the application by the second IT security tool; automatically generating a second input vector based on the second vulnerability description in the data record of the second vulnerability; generating, by the machine learning model and using the second input vector, a probability score for the second vulnerability; automatically determining, based on the probability score for the second vulnerability, a positivity classification for the second vulnerability; and causing presentation, in the user interface, of second output data representing the positivity classification for the second vulnerability, the user interface presenting the first output data and the second output data in a unified dashboard.

Example 15 is a method comprising: accessing, by one or more processors, a data record of a vulnerability, the data record generated by an information technology (IT) security tool and comprising a vulnerability description; automatically generating, by the one or more processors, an input vector based on the vulnerability description; generating, by a machine learning model and using the input vector, a probability score for the vulnerability; automatically determining, by the one or more processors and based on the probability score for the vulnerability, a positivity classification for the vulnerability; and causing presentation, by the one or more processors, in a user interface, of output data representing the positivity classification for the vulnerability.

In Example 16, the subject matter of Example 15 includes, wherein the positivity classification indicates that the vulnerability is a false positive, the method further comprising: generating a confidence indicator associated with the positivity classification for the vulnerability; and based on the positivity classification and the confidence indicator for the vulnerability, invoking an automatic triaging function.

In Example 17, the subject matter of Example 16 includes, wherein the invoking of the automatic triaging function comprises: detecting that the confidence indicator associated with the positivity classification for the vulnerability is above a threshold; and in response to detecting that the confidence indicator is above the threshold, invoking the automatic triaging function to triage the vulnerability automatically and to include an automatic triaging indicator in the output data.

Example 18 is a non-transitory computer-readable medium that stores instructions that, when executed by one or more processors, cause the one or more processors to perform operations comprising: accessing a data record of a vulnerability, the data record generated by an information technology (IT) security tool and comprising a vulnerability description; automatically generating an input vector based on the vulnerability description; generating, by a machine learning model and using the input vector, a probability score for the vulnerability; automatically determining, based on the probability score for the vulnerability, a positivity classification for the vulnerability; and causing presentation, in a user interface, of output data representing the positivity classification for the vulnerability.

In Example 19, the subject matter of Example 18 includes, wherein the positivity classification indicates that the vulnerability is a false positive, the operations further comprising: generating a confidence indicator associated with the positivity classification for the vulnerability; and based on the positivity classification and the confidence indicator for the vulnerability, invoking an automatic triaging function.

In Example 20, the subject matter of Example 19 includes, wherein the invoking of the automatic triaging function comprises: detecting that the confidence indicator associated with the positivity classification for the vulnerability is above a threshold; and in response to detecting that the confidence indicator is above the threshold, invoking the automatic triaging function to triage the vulnerability automatically and to include an automatic triaging indicator in the output data.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 9:
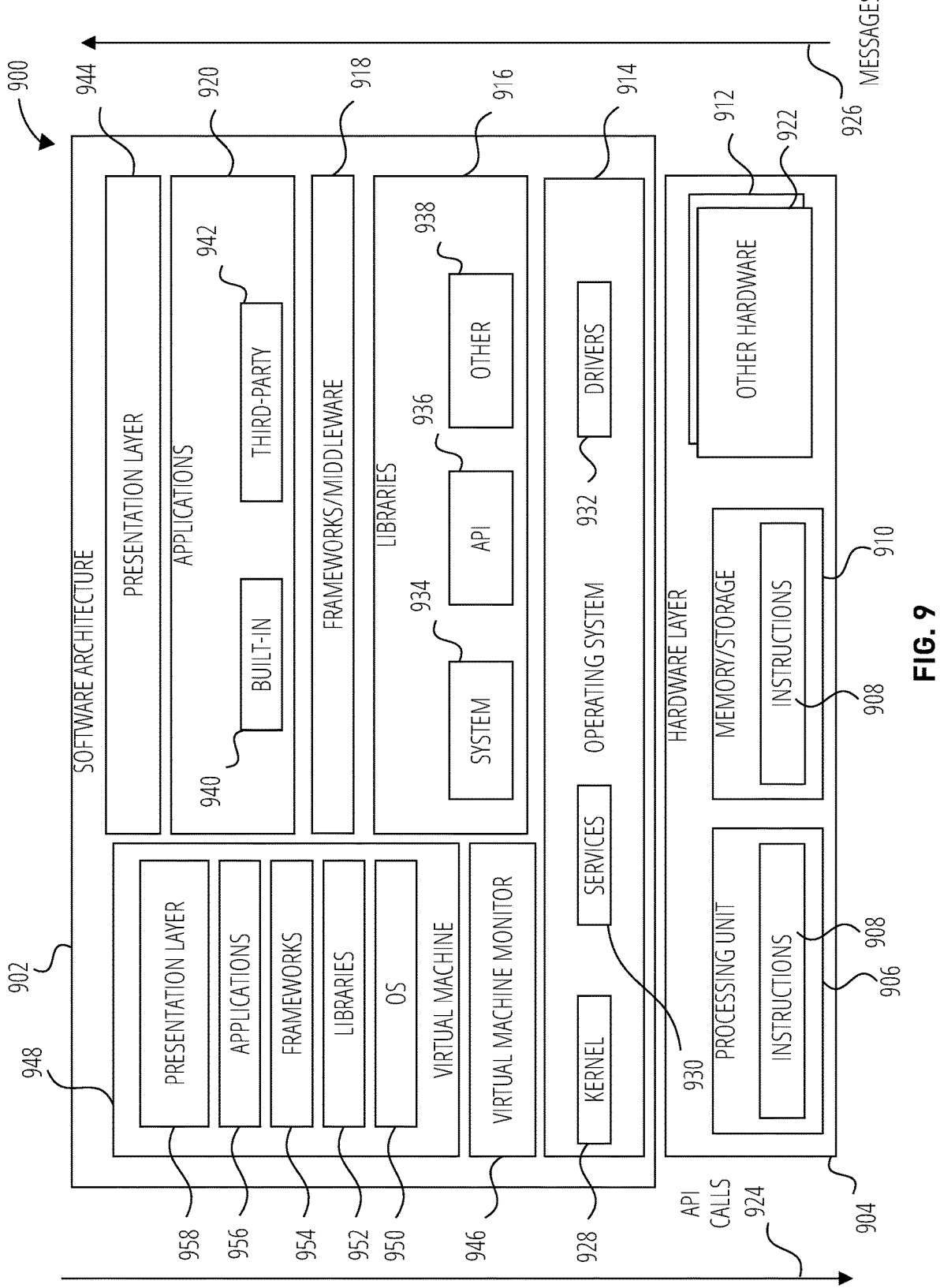
FIG. 9 is a block diagram showing a software architecture for a computing device, according to some examples.

FIG. 9 is a block diagram 900 showing a software architecture 902 for a computing device, according to some examples. The software architecture 902 may be used in conjunction with various hardware architectures, for example, as described herein. FIG. 9 is merely a non-limiting illustration of a software architecture, and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 and other hardware 922 which represent any other hardware of the hardware layer 904, such as the other hardware illustrated as part of the software architecture 902.

In the architecture of FIG. 9, the software architecture 902 may be conceptualized as a stack of layers where each layer provides particular functionality. For example, the software architecture 902 may include layers such as an operating system 914, libraries 916, frameworks/middleware layer 918, applications 920, and presentation layer 944. Operationally, the applications 920 or other components within the layers may invoke API calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the software architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 916 may provide a common infrastructure that may be utilized by the applications 920 or other components or layers. The libraries 916 typically provide functionality that allows other software modules to perform tasks in an easier fashion than to interface directly with the underlying operating system 914 functionality (e.g., kernel 928, services 930 or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware layer 918 may provide a higher-level common infrastructure that may be utilized by the applications 920 or other software components/modules. For example, the frameworks/middleware layer 918 may provide various graphic user interface (GUI) functions, high-level resource management, high-level location services, and so forth. The frameworks/middleware layer 918 may provide a broad spectrum of other APIs that may be utilized by the applications 920 or other software components/modules, some of which may be specific to a particular operating system or platform.

The applications 920 include built-in applications 940 or third-party applications 942. Examples of representative built-in applications 940 may include, but are not limited to, a contacts application, a browser application, a book reader application, a location application, a media application, a messaging application, or a game application. Third-party applications 942 may include any of the built-in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built in operating system functions (e.g., kernel 928, services 930 or drivers 932), libraries (e.g., system libraries 934, API libraries 936, and other libraries 938), and frameworks/middleware layer 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (e.g., operating system 914). A software architecture executes within the virtual machine 948 such as an operating system 950, libraries 952, frameworks/middleware 954, applications 956 or presentation layer 958. These layers of software architecture executing within the virtual machine 948 can be the same as corresponding layers previously described or may be different.

Modules, Components and Logic

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Electronic Apparatus and System

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Example Machine Architecture and Machine-Readable Medium

Figure 10:
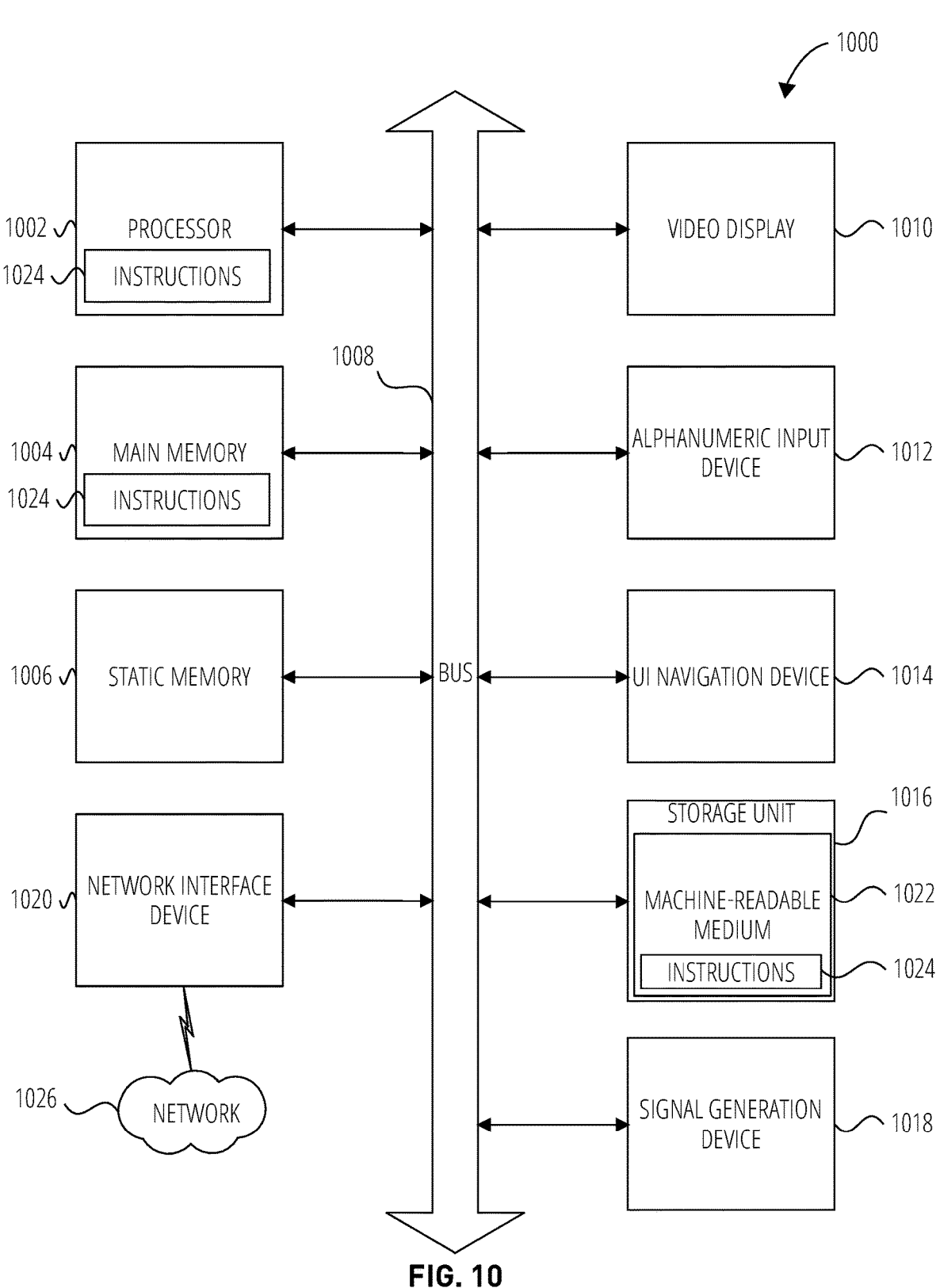
FIG. 10 is a block diagram of a machine in the form of a computer system, according to some examples, within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface navigation (or cursor control) device 1014 (e.g., a mouse), a storage unit 1016, a signal generation device 1018 (e.g., a speaker), and a network interface device 1020.

Machine-Readable Medium

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 or within the processor 1002 during execution thereof by the computer system 1000, with the main memory 1004 and the processor 1002 also each constituting a machine-readable medium 1022.

While the machine-readable medium 1022 is shown in accordance with some examples to be a single medium, the term "machine-readable medium" may include a single medium or multiple media (e.g., a centralized or distributed database, or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of a machine-readable medium 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1024 may further be transmitted or received over a communications network 1026 using a transmission medium. The instructions 1024 may be transmitted using the network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi® and Wi-Max networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually, or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

What is claimed is:

1. A system comprising:

a memory that stores instructions; and one or more processors configured by the instructions to perform operations comprising:

accessing first data comprising a data record of a vulnerability, the data record generated by an information technology (IT) security tool and comprising a vulnerability description;

automatically generating an input vector based on the vulnerability description in the first data;

generating, by a machine learning model and using the input vector, a probability score for the vulnerability;

automatically determining, based on the probability score for the vulnerability, a positivity classification for the vulnerability, wherein the positivity classification indicates that the vulnerability is a false positive;

in response to determining the false positive:

accessing second data comprising historical triaging data stored in a database, the historical triaging data comprising, for each of a plurality of vulnerabilities, a vulnerability identifier, a vulnerability description, a triaging status indicating a severity classification assigned to a corresponding vulnerability, and a triaging reason indicating a rationale as to why the severity classification was assigned to the corresponding vulnerability, and generating, based on the second data, a plurality of candidate triaging reasons for the false positive, each candidate triaging reason being a different rationale as to why the positivity classification indicates that the vulnerability is a false positive;

causing presentation, in a user interface, of output data representing the positivity classification for the vulnerability, the output data indicating the false positive and including the plurality of candidate triaging reasons;

receiving a user selection of a triaging reason from among the plurality of candidate triaging reasons presented in the user interface; and performing a triaging process to triage the vulnerability using the user selection of the triaging reason provided via the user interface.

2. The system of claim 1, wherein the data record of the vulnerability further comprises a severity score, the input vector being generated based on the vulnerability description and the severity score.

3. The system of claim 2, wherein the generating of the input vector comprises:

applying a natural language processing algorithm to one or more text objects in the vulnerability description to obtain a numerical representation of the one or more text objects; and generating the input vector based on the severity score and the numerical representation of the one or more text objects.

4. The system of claim 3, wherein the natural language processing algorithm is a bag-of-words algorithm, the numerical representation of the one or more text objects representing each text object as an input feature and further representing a frequency of the text object within the vulnerability description as a feature value.

5. The system of claim 3, further comprising, prior to applying the natural language processing algorithm:

pre-processing the vulnerability description to remove one or more predefined text objects from the vulnerability description to obtain a pre-processed vulnerability description, wherein the pre-processed vulnerability description is used to generate the input vector.

6. The system of claim 1, wherein the machine learning model comprises a logistic regression model.

7. The system of claim 1, wherein the causing presentation of the output data further comprises causing presentation, in the user interface, of a confidence indicator in association with the positivity classification for the vulnerability.

8. The system of claim 1, the operations further comprising:

causing presentation of a triaging element in the user interface, the triaging element being user-selectable to adjust the positivity classification for the vulnerability.

9. The system of claim 1, wherein the data record of the vulnerability identifies an application, the vulnerability having been detected in the application by the IT security tool.

10. The system of claim 9, wherein the vulnerability is a first vulnerability, wherein the IT security tool is a first IT security tool, wherein the vulnerability description is a first vulnerability description, wherein the input vector is a first input vector, and wherein the output data is first output data, the operations further comprising:

accessing a data record of a second vulnerability generated by a second IT security tool, the data record of the second vulnerability comprising a second vulnerability description and identifying the application, the second vulnerability having been detected in the application by the second IT security tool;

automatically generating a second input vector based on the second vulnerability description in the data record of the second vulnerability;

generating, by the machine learning model and using the second input vector, a probability score for the second vulnerability;

automatically determining, based on the probability score for the second vulnerability, a positivity classification for the second vulnerability; and causing presentation, in the user interface, of second output data representing the positivity classification for the second vulnerability, the user interface presenting the first output data and the second output data in a unified dashboard.

11. The system of claim 1, the operations further comprising:

selecting the plurality of candidate triaging reasons based on similarities in at least one of vulnerability descriptions or severity scores between the first data and the second data.

12. A method comprising:

accessing first data comprising a data record of a vulnerability, the data record generated by an information technology (IT) security tool and comprising a vulnerability description;

automatically generating an input vector based on the vulnerability description in the first data;

generating, by a machine learning model and using the input vector, a probability score for the vulnerability;

automatically determining, based on the probability score for the vulnerability, a positivity classification for the vulnerability, wherein the positivity classification indicates that the vulnerability is a false positive;

in response to determining the false positive:

accessing second data comprising historical triaging data stored in a database, the historical triaging data comprising, for each of a plurality of vulnerabilities, a vulnerability identifier, a vulnerability description, a triaging status indicating a severity classification assigned to a corresponding vulnerability, and a triaging reason indicating a rationale as to why the severity classification was assigned to the corresponding vulnerability, and generating, based on the second data, a plurality of candidate triaging reasons for the false positive, each candidate triaging reason being a different rationale as to why the positivity classification indicates that the vulnerability is a false positive;

causing presentation, in a user interface, of output data representing the positivity classification for the vulnerability, the output data indicating the false positive and including the plurality of candidate triaging reasons;

receiving a user selection of a triaging reason from among the plurality of candidate triaging reasons presented in the user interface; and performing a triaging process to triage the vulnerability using the user selection of the triaging reason provided via the user interface.

13. The method of claim 12, wherein the data record of the vulnerability further comprises a severity score, the input vector being generated based on the vulnerability description and the severity score.

14. The method of claim 13, wherein the generating of the input vector comprises:

applying a natural language processing algorithm to one or more text objects in the vulnerability description to obtain a numerical representation of the one or more text objects; and generating the input vector based on the severity score and the numerical representation of the one or more text objects.

15. The method of claim 12, wherein the causing presentation of the output data further comprises causing presentation, in the user interface, of a confidence indicator in association with the positivity classification for the vulnerability.

16. The method of claim 12, further comprising:

causing presentation of a triaging element in the user interface, the triaging element being user-selectable to adjust the positivity classification for the vulnerability.

17. A non-transitory computer-readable medium that stores instructions that, when executed by one or more processors, cause the one or more processors to perform operations comprising:

accessing first data comprising a data record of a vulnerability, the data record generated by an information technology (IT) security tool and comprising a vulnerability description;

automatically generating an input vector based on the vulnerability description in the first data;

generating, by a machine learning model and using the input vector, a probability score for the vulnerability;

automatically determining, based on the probability score for the vulnerability, a positivity classification for the vulnerability, wherein the positivity classification indicates that the vulnerability is a false positive;

in response to determining the false positive:

accessing second data comprising historical triaging data stored in a database, the historical triaging data comprising, for each of a plurality of vulnerabilities, a vulnerability identifier, a vulnerability description, a triaging status indicating a severity classification assigned to a corresponding vulnerability, and a triaging reason indicating a rationale as to why the severity classification was assigned to the corresponding vulnerability, and generating, based on the second data, a plurality of candidate triaging reasons for the false positive, each candidate triaging reason being a different rationale as to why the positivity classification indicates that the vulnerability is a false positive;

causing presentation, in a user interface, of output data representing the positivity classification for the vulnerability, the output data indicating the false positive and including the plurality of candidate triaging reasons;

receiving a user selection of a triaging reason from among the plurality of candidate triaging reasons presented in the user interface; and performing a triaging process to triage the vulnerability using the user selection of the triaging reason provided via the user interface.

18. The non-transitory computer-readable medium of claim 17, wherein the data record of the vulnerability further comprises a severity score, the input vector being generated based on the vulnerability description and the severity score.

19. The non-transitory computer-readable medium of claim 17, wherein the causing presentation of the output data further comprises causing presentation, in the user interface, of a confidence indicator in association with the positivity classification for the vulnerability.

20. The non-transitory computer-readable medium of claim 17, further comprising:

causing presentation of a triaging element in the user interface, the triaging element being user-selectable to adjust the positivity classification for the vulnerability.

* * * * *